US009702096B2

(12) United States Patent
Fritz et al.

(10) Patent No.: US 9,702,096 B2
(45) Date of Patent: *Jul. 11, 2017

(54) AUTOMOTIVE CONSTRUCTION MACHINE AND METHOD FOR CONTROLLING AN AUTOMOTIVE CONSTRUCTION MACHINE

(71) Applicant: Wirtgen GmbH, Windhagen (DE)

(72) Inventors: Matthias Fritz, Linz (Rhein) (DE); Achim Busenbender, Bad Honnef (DE); Cyrus Barimani, Konigswinter (DE)

(73) Assignee: Wirtgen GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/092,832

(22) Filed: Apr. 7, 2016

(65) Prior Publication Data

US 2017/0044727 A1    Feb. 16, 2017

Related U.S. Application Data

(63) Continuation of application No. 14/672,502, filed on Mar. 30, 2015, now Pat. No. 9,309,632.

(30) Foreign Application Priority Data

Apr. 4, 2014    (DE) .................... 10 2014 005 077

(51) Int. Cl.
*E01C 19/48*    (2006.01)
*E01C 23/088*    (2006.01)
(Continued)

(52) U.S. Cl.
CPC ........ *E01C 19/4893* (2013.01); *B62D 55/116* (2013.01); *E01C 19/48* (2013.01);
(Continued)

(58) Field of Classification Search
CPC .. E01C 19/4893; E01C 23/088; E01C 23/127; E01C 2301/00
See application file for complete search history.

(56) References Cited

U.S. PATENT DOCUMENTS

| 3,423,859 A | 1/1969 | Swisher, Jr. et al. |
| 3,598,027 A | 8/1971 | Swisher, Jr. |

(Continued)

FOREIGN PATENT DOCUMENTS

| EP | 1103659 A2 | 5/2001 |
| EP | 1154075 A2 | 11/2001 |

(Continued)

*Primary Examiner* — Calvin Cheung
(74) *Attorney, Agent, or Firm* — Lucian Wayne Beavers; Patterson Intellectual Property Law, PC (57) ABSTRACT

An automotive construction machine, in particular a slipform paver or a road milling machine, has at least one front running gear and one rear running gear in the working direction. As the construction machine advances, the lifting systems of the front running gear are extended or retracted such that the machine frame remains in a predetermined orientation to the surface of the ground in the longitudinal direction. Irregularities in the ground surface are detected as the construction machine advances, and the position of the front lifting systems, predetermined by the control or regulating unit, is monitored to keep the machine frame in a predetermined orientation to the ground surface. As the construction machine advances, the control of the rear lifting systems is engaged with a time delay subject to the control of the front lifting systems. Consequently, the working system of the construction machine, in particular the concrete mold or milling drum, is adjusted to the correct height with respect to the ground surface, so that the working system does not copy the course of the ground.

20 Claims, 8 Drawing Sheets

(51) Int. Cl.
  *B62D 55/116* (2006.01)
  *E01C 23/07* (2006.01)
  *E01C 23/12* (2006.01)

(52) U.S. Cl.
  CPC ............ *E01C 23/07* (2013.01); *E01C 23/088* (2013.01); *E01C 23/127* (2013.01); *E01C 2301/00* (2013.01)

(56) References Cited

U.S. PATENT DOCUMENTS

| | | | |
|---|---|---|---|
| 3,946,506 A | 3/1976 | Snow, Jr. et al. | |
| 3,969,035 A * | 7/1976 | Silbernagel | E01C 19/4893 404/98 |
| 4,139,318 A | 2/1979 | Jakob et al. | |
| 4,195,740 A * | 4/1980 | Beduhn | B66C 23/78 180/9.1 |
| 4,222,581 A * | 9/1980 | Treadwell | B62D 55/062 180/41 |
| 4,325,580 A | 4/1982 | Swisher, Jr. et al. | |
| 4,943,119 A | 7/1990 | Zarniko et al. | |
| 5,309,407 A | 5/1994 | Sehr et al. | |
| 5,315,770 A | 5/1994 | Campbell | |
| 5,378,081 A | 1/1995 | Swisher, Jr. | |
| 5,436,385 A * | 7/1995 | Kaden | B09B 1/00 405/128.1 |
| 5,607,205 A | 3/1997 | Burdick et al. | |
| 5,639,181 A | 6/1997 | Swisher, Jr. | |
| 5,893,677 A | 4/1999 | Haehn et al. | |
| 5,984,420 A | 11/1999 | Murray et al. | |
| 6,371,566 B1 | 4/2002 | Haehn | |
| 6,481,924 B1 | 11/2002 | Smolders et al. | |
| 7,828,309 B2 | 11/2010 | Berning et al. | |
| 7,950,478 B2 * | 5/2011 | Terry | B60G 5/005 180/9.46 |
| 8,113,592 B2 | 2/2012 | Busley et al. | |
| 8,118,316 B2 | 2/2012 | Berning et al. | |
| 8,246,270 B2 | 8/2012 | Berning et al. | |
| 8,308,395 B2 | 11/2012 | Jurasz et al. | |
| 8,424,972 B2 | 4/2013 | Berning et al. | |
| 8,496,400 B2 | 7/2013 | Aeschlimann et al. | |
| 8,794,867 B2 * | 8/2014 | Snoeck | E01C 23/088 299/39.6 |
| 9,133,586 B2 | 9/2015 | Reuter et al. | |
| 9,458,581 B1 * | 10/2016 | Schaeding | E01C 23/01 |
| 2002/0047301 A1 * | 4/2002 | Davis | E01C 19/006 299/1.5 |
| 2007/0286678 A1 | 12/2007 | Berning et al. | |
| 2008/0152428 A1 | 6/2008 | Berning et al. | |
| 2012/0263531 A1 | 10/2012 | Rutz et al. | |
| 2015/0125252 A1 * | 5/2015 | Berzen Ratzel | B62D 12/02 414/800 |

FOREIGN PATENT DOCUMENTS

| | | |
|---|---|---|
| EP | 2104768 A1 | 9/2009 |
| WO | 2006094795 A1 | 9/2006 |
| WO | 2008077963 A1 | 7/2008 |
| WO | 2011026504 A1 | 3/2011 |

* cited by examiner

AUTOMOTIVE CONSTRUCTION MACHINE AND METHOD FOR CONTROLLING AN AUTOMOTIVE CONSTRUCTION MACHINE

BACKGROUND OF THE INVENTION

1. Field of the Invention

The invention relates to an automotive construction machine, in particular to a slipform paver or a road milling machine. The invention also relates to a method for controlling an automotive construction machine, in particular for controlling a slipform paver or a road milling machine.

2. Description of the Prior Art

Known slipform pavers are known for the continuous production of building structures from a flowable material. They have a device in which the flowable material is brought into the required form. A device of this type for forming the flowable material is also known as a concrete mold. Concrete guide walls for example can be produced on the ground by slipform pavers. Known road milling machines have a milling drum which mills material off the ground.

Known slipform pavers and road milling machines have a chassis which comprises at least one front and rear running gear in the working direction, and a machine frame on which the device for forming flowable material is provided or on which the milling drum is provided. The machine frame is supported by the lifting system associated with the running gear, so that the machine frame and running gear are movable relative to one another and thus the height and orientation of the machine frame is adjustable with respect to the ground. The concrete mold and the milling drum are fastened to the machine frame so that they are vertically adjustable with respect to the ground. The running gear can be crawler tracked running gear or wheels.

A slipform paver is known for example from WO 2011 026 504 A1 (U.S. Pat. No. 8,496,400) and a road milling machine is known for example from EP 2 104 768 B1 (U.S. Pat. No. 8,424,972).

As the construction machine advances, the machine frame should have a parallel orientation to the ground surface, seen in the longitudinal direction. The orientation in the transverse direction is determined by the respective case of use and is often also parallel to the ground surface. In this context, "ground surface" is understood as an idealised flat surface which is free from any unevenness and which can be inclined with respect to the horizontal in the longitudinal and/or transverse direction. However, in practice, the surface of the ground will exhibit unevennesses, i.e. it will not be flat.

The construction machine known from EP 2 104 768 B1 (U.S. Pat. No. 8,424,972) has a control unit which can retract or extend the lifting systems associated with the running gear such that the machine frame remains in a parallel orientation to the ground surface. A control unit of this type can also be provided on a slipform paver.

In a slipform paver, the concrete mold fastened to the machine frame is guided over the ground as the construction machine advances. The underside of the concrete mold is open and the sides of the mold are delimited by side plates. The top of the mold is delimited by a cover plate. The flowable material issues at the rear of the mold. In the mold, the concrete is compacted between the cover plate and the side plates on the one hand and between the cover plate and the ground on the other hand before it emerges at the rear of the mold in the desired form.

As the slipform paver advances, the cover plate of the concrete mold should always be at the same height with respect to the ground, so that the building structure, for example the guide wall is always at the same height in the longitudinal direction. To adjust the height of the concrete mold with respect to the ground, the lifting systems are extended and retracted so that the mold is raised or lowered with the machine frame.

Adjusting the height of the machine frame proves to be relatively easy on flat ground. However, if the ground is not flat, the height of the mold has to be corrected with respect to the surface of the ground as the construction machine advances. A correction in height is also necessary because the running gear do not run in the same track in which the building structure is erected. In this respect, various solutions are known in the prior art. One solution which is simple, economical and frequently used is to scan the surface of the ground with suitable contacting or contact-free sensors to adjust a constant distance of the concrete mold from the ground surface. However, a disadvantage of this solution is that possible unevennesses of the ground surface are "copied", because the upper edge of the building structure is always at a constant distance from the actual surface of the ground so that the unevennesses of the ground surface are transferred to the building structure.

To solve this problem, in the prior art stringlines are used which are tensioned at a predetermined height and in a predetermined orientation above the ground with the purpose of representing the desired course of the building structure. To compensate for the irregularities in the ground surface, this building structure should have different heights in the longitudinal direction, i.e. where there is a depression in the ground, it should have a greater height and where there is an elevation of the ground, it should have a lower height so that the upper edge of the building structure is always at the same height in the longitudinal direction.

It is a disadvantage that the stringlines have to be previously tensioned and calibrated which is time-consuming and expensive. Furthermore, the tensioned stringlines obstruct the operation of the building site. In the case of a slipform paver, if a stringline is not used, irregularities in the ground, for example elevations or depressions which occur in portions can therefore result in fluctuations in height of the building structure in the longitudinal direction. The same problem arises in the case of a road milling machine, because the height of the machine frame with respect to the surface of the ground determines the milling depth.

SUMMARY OF THE INVENTION

The object of the invention is to provide a construction machine, in particular a slipform paver or a road milling machine, using which optimum working results can be achieved without using a stringline even when there are irregularities in the profile of the ground surface. A further object of the invention is to provide a method for controlling an automotive construction machine, in particular a slipform paver or road milling machine, by means of which optimum working results can be achieved without using a stringline even when there are irregularities in the profile of the ground surface.

These objects are achieved according to the invention by the features of the independent claims. The subjects of the dependent claims relate to advantageous embodiments of the invention.

The construction machine according to the invention has at least one front and rear running gear in the working direction. The construction machine preferably has two front and two rear running gear. However, it can also have only one front or rear running gear. In this context, "running gear" is understood as tracked running gear and as running gear having wheels.

The control or regulating unit of the construction machine according to the invention is configured such that as the construction machine advances, the lifting system associated with the front running gear is extended or retracted or the lifting systems associated with the front running gear are extended or retracted such that the machine frame remains in a predetermined orientation to the surface of the ground in the longitudinal direction. The construction machine according to the invention requires a control of this type. In this respect, the orientation of the machine frame is based on an ideal surface free from irregularities, so that local depressions or elevations are not considered.

Here, "control or regulating unit" is understood as any unit which can control and/or regulate the lifting systems. In this respect, a distinction is not made between control and regulation. The control or regulating unit can be a self-contained unit which is independent of the machine control, or it can be configured as a component of the machine control.

The orientation of the machine frame in the longitudinal direction can be freely selected within a wide range irrespective of the use, but it should preferably be a parallel orientation. The machines can be used in an optimum manner when the machine frame is oriented parallel to the ground surface. Thus, for example the concrete mold of a slipform paver forms with the surface of the ground a mold which is closed on all sides and which tapers in a direction opposite the direction of travel. In the case of a road milling machine, the loading process, inter alia, of the milled material is optimised by the parallel orientation of the machine frame.

The operating principle of the construction machine according to the invention is based on the fact that irregularities in the ground surface can be detected as the construction machine advances in that the front lifting system is retracted or extended or the front lifting systems are retracted or extended to keep the machine frame in a predetermined orientation to the ground as the construction machine advances. The surface of the ground is thus reflected in the control of the front running gear or of the plurality of front running gear.

In the construction machine according to the invention, as said machine advances the control of the rear lifting system or of the rear lifting systems is engaged with a time delay subject to the control of the front lifting system or of the front lifting systems, which control results in a parallel orientation of the machine frame to the ideal surface of the ground free from unevenness. Consequently, the height adjusted by the rear lifting system, or by the rear lifting systems, of the device for forming flowable material or of the milling drum is corrected at least in part with respect to the ground, so that irregularities in the surface of the ground are compensated at least in part.

The control or regulation according to the invention presupposes that irregularities in the surface of the ground lead to an extension or retraction of the front lifting system(s). Elevations which occur in portions are compensated by retraction of the front lifting system(s), whereas depressions are compensated by extension of the front lifting system(s) to keep the machine frame in a predetermined orientation to the ground.

One embodiment of the invention provides a monitoring of the position of the front lifting system(s) to be able to engage in the control of the rear lifting system(s) with a time delay. It is possible to engage in the control of the rear lifting system(s) subject to a variable which correlates with the position of the front lifting system(s).

An alternative embodiment of the invention does not provide a monitoring of the position of the front lifting system(s), but provides a monitoring of the distance between the machine frame and the ground. In this respect, it is assumed that the machine frame is oriented parallel to the ideal, unevenness-free surface of the ground due to the control. In this embodiment which is of independent inventive significance, the distance between any reference point on the machine frame and the ground surface is monitored by one or more suitable transducers. The reference point can be on the machine frame in the working direction upstream of the rear running gear or of the plurality of rear running gear, in particular upstream of the front running gear or of the plurality of front running gear. The control of the rear lifting system(s) is then engaged subject to a variable which correlates with the distance and which can be detected by one or more suitable transducers.

A tactile or contact-free distance detection means can be provided to detect the distance between the reference point on the machine frame and the ground.

When the lifting position of the front lifting system is monitored, the front running gear with the lifting system is a tactile distance detection means, in which case the running gear scans the ground. Therefore, additional components for detecting the distance are not required. Furthermore, the required corrective movement of the rear running gear which should have the same support surface as the front running gear can be optimally determined using the front running gear as the scanning element of a scanning means.

The construction machine according to the invention preferably provides that when there are irregularities in the ground surface, the movement of the front lifting system or of the front running gear is superimposed on the movement of the rear lifting system or of the rear running gear. If the front running gear travels over an elevation in the ground for example, the profile thereof is shown in the upwards and downwards movement of the running gear or in the movement of the lifting system. The same applies to travelling through a depression. Since the rear running gear follows the front running gear, the position of the rear running gear must be corrected by the same amount by which the front running gear has been raised or lowered to compensate for the elevation or depression. Consequently, the working system of the construction machine, in particular the concrete mold or milling drum, is adjusted to the correct height with respect to the ground surface while the rear running gear travels over the elevation or travels through the depression, so that the mold or milling drum does not follow the irregularity and is kept at the required height irrespective of a local irregularity in the ground surface.

The time delay at which engagement is effected in the control of the rear lifting system(s) is subject to the advance speed of the construction machine. The advance speed of the construction machine can be determined or a distance measurement can be made for the control or regulation according to the invention. It is possible to determine the time at which the rear running gear reaches the area on the ground at which the front running gear has been raised or lowered with respect to the machine frame, this time again resulting from the advance speed and the distance between the front and rear running gear in the longitudinal direction of the machine frame.

In a preferred embodiment, a distance measuring means is provided for measuring the distance travelled by the construction machine, the control or regulating unit being configured such that the control of the rear lifting system or rear lifting systems is corrected when the construction machine has travelled a predetermined distance. This distance can correspond to the distance between the front and rear running gear.

For the control or regulation according to the invention, it is unimportant how the front lifting system(s) for adjusting the machine frame in a preferably parallel orientation to the ground surface is/are controlled. To control the front lifting system(s), a means for determining the orientation of the machine frame with respect to the surface of the ground is preferably provided, which means can have a distance measuring means which measures the distance from the ground surface and/or it can have a measuring means which measures the inclination to the horizontal. Here, it is possible to use as measuring means all means known from the prior art including but not restricted to ultrasonic sensors, laser scanners, electronic inclination sensors etc.

When the inclination to the horizontal is measured, the inclination of the ground must be known in order to be able to orient the machine frame parallel to the ground surface. These data can be provided by different systems. For example, the inclination of the ground can be determined from the height information of a GNSS-based system.

The front and rear lifting systems are preferably hydraulic lifting columns which connect the machine frame and the running gear, the longitudinal axes of the lifting columns preferably being arranged at a right angle to the longitudinal axis of the machine frame.

If the construction machine according to the invention is a slipform paver with a device for forming flowable material, the outlet of the device for forming flowable material should be arranged in the longitudinal direction of the slipform paver at the level of the rear running gear or of the plurality of rear running gear, so that when the front part of the machine frame is raised and lowered to adjust an orientation parallel to the ground surface, the concrete mold retains its height there with respect to the ground surface.

In the case of a slipform paver with two rear running gear, the concrete mold can be arranged on one side of the machine frame next to one of the two running gear. The rear end of the concrete mold in the working direction should preferably be located in the longitudinal direction of the machine frame at the level of the longitudinal axis of the lifting system or at the level of the center of gravity of the associated running gear standing on the ground, the longitudinal axis of the lifting system preferably running transversely to the longitudinal axis of the machine frame and through the center of gravity of the running gear.

If the construction machine is a road milling machine with a milling drum, the milling drum should be arranged in the longitudinal direction of the road milling machine at the level of the rear running gear or at the level of the plurality of rear running gear. This is the case with known small milling machines in which the milling drum is arranged between the two rear running gear. However, the invention can also be used effectively in the case of known large milling machines. Large milling machines are characterised in that the milling drum is arranged substantially centrally between the running gear of the front axle and the running gear of the rear axle. In this case, the values need to be converted according to the lever ratios between the axis of the milling drum and of the respective lifting system.

BRIEF DESCRIPTION OF THE DRAWINGS

In the following, an embodiment of the invention will be described in more detail with reference to the drawings, in which.

DETAILED DESCRIPTION

Figure 1:
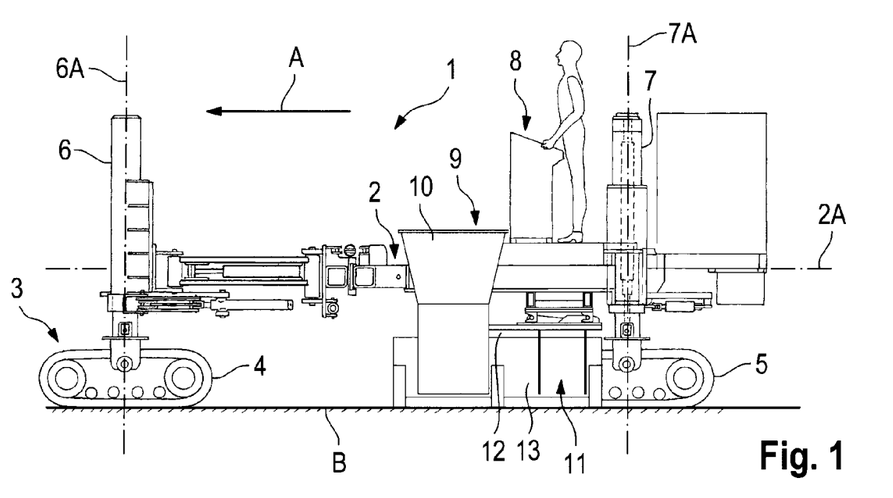
FIG. 1 is a side view of a slipform paver without the conveying means.

FIGS. 1A and 1B show a slipform paver which is described in detail in European patent application EP 1 103 659 A2 (U.S. Pat. No. 6,481,924). Since the slipform paver as such belongs to the prior art, only the components of the construction machine which are essential to the invention are described here.

The slipform paver 1 has a machine frame 2 which is supported by a chassis 3. The chassis 3 has two front crawler tracked running gear 4 and two rear crawler tracked running gear 5 in the travel or working direction A. The running gears may also be referred to as ground engaging units. The front and rear running gear 4, 5 are respectively attached to front and rear lifting columns 6, 7 which are attached to the machine frame 2 so that the machine frame 2 is vertically adjustable with respect to the ground B or so that the machine frame and running gear are movable relative to one another. The longitudinal axes 6A, 7A of the lifting columns 6, 7 run at a right angle to the longitudinal axis 2A of the machine frame 2. The running gears 4 and 5 may be wheels instead of crawler tracks.

The operator's platform 8 of the slipform paver is located on the machine frame 2. Fastened to the machine frame 2 is a device 9 for forming flowable material, in particular concrete, which is denoted in the following as a concrete mold. The concrete mold 9 has a chute 10 for the feed of concrete which is arranged above a mold proper 11, which may also simply be referred to as mold 11. The mold 11 which is open at the bottom is delimited at the top by a cover plate 12 and at the sides by side plates 13. The concrete issues at the rear of the mold 11, the rearward end of the mold 11 being located at the level of the longitudinal axes 7A of the rear lifting columns 7 in the longitudinal direction of the slipform paver. The side plates 13 are vertically adjustable so that when the machine frame 2 is raised and lowered, concrete cannot escape at the sides. The height of the concrete mold 9 with respect to the ground B determines the height of the building structure to be erected, for example a guide wall.

In the following, a slipform paver 1 according to the invention will be described as an example of a construction machine with reference to FIGS. 2 to 6, in which the size of the individual parts is not shown true-to-scale to provide a clearer overview. The slipform paver has two front and rear running gear 4, 5 which have merely been indicated and on which two front and rear lifting columns 6, 7 are attached, to which the front and rear running gear 4, 5 are attached which stand on the ground B. The concrete mold 9 is positioned next to the rear left running gear 5, the rearward end of the mold 9 being located in the longitudinal direction of the machine frame 2 at the level of the longitudinal axis 7A of the rear lifting column 7 or at the level of the center of gravity of the contact area of the running gear.

The height of the cover plate 12 of the concrete mold 9 above the ground surface and thus the height of the building structure to be erected is determined by the position of the lifting columns 6, 7. To erect the building structure, the lifting columns 6, 7 are adjusted such that the cover plate 12 is at the correct height above the ground surface. In the following, this position of the lifting columns 6, 7 will be called the starting position. To control the lifting columns, the slipform paver has a central control or regulating unit 14 which is merely indicated in the figures.

The control or regulating unit 14 has a first control loop 14A which controls the lifting position of the rear lifting columns 7 such that the distance x of the cover plate 12 of the concrete mold from the ground remains constant and corresponds to a predetermined height of the building structure. With this control, the upper edge of the mold follows the ground as the construction machine advances. The distance x of the cover plate 12 of the concrete mold from the ground is measured by a distance sensor 15A, for example by an ultrasonic sensor, which can be positioned in the longitudinal direction at the level of the axis 7A of the rear lifting column 7. A correction of this control is described in the following.

Figure 8A:
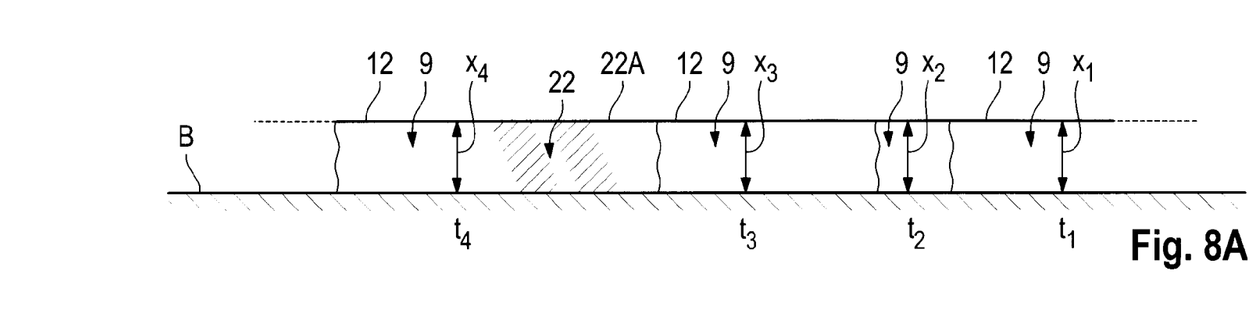
FIG. 8A shows the movement of a working system of a construction machine without the correction engagement in the control of the rear lifting system, the ground having a flat surface.

FIG. 8A shows in a greatly simplified schematic manner, with exaggerated proportions, the movement of the concrete mold 9 when the ground is flat. The first control loop 14A ensures with the control of the rear lifting columns 7 that the distance $x_1$, $x_2$, $x_3$ of the cover plate 12 of the concrete mold 9 from the ground is constant at times $t_1$, $t_2$, $t_3$ ($x=x_1=x_2=x_3$). However, this case is not critical. The upper edge 22A of the building structure 22 which is merely indicated and which corresponds to the upper edge of the mold 9 is always at the same height as the machine advances.

Figure 8B:
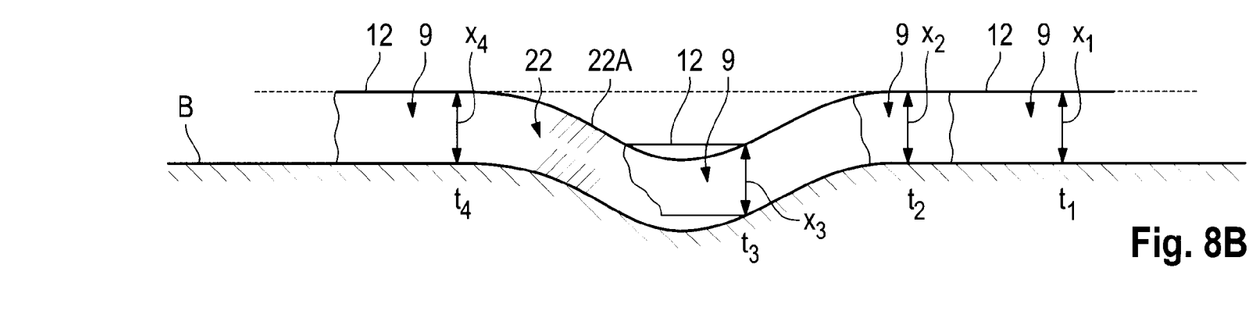
FIG. 8B shows the movement of a working system of a construction machine without the correction engagement according to the invention in the control of the rear lifting system, the ground having a depression.

FIG. 8B shows the movement of the concrete mold 9 when the ground is not flat but has a depression. It can be seen that the first control loop 14A again keeps constant the distance $x_1$, $x_2$, $x_3$ of the cover plate 12 of the concrete mold 9 from the ground at the times $t_1$, $t_2$, $t_3$ ($x=x_1=x_2=x_3$). While travelling through the depression, the upper edge of the mold follows the course of the ground. Consequently, the upper edge 22A of the building structure 22 is no longer at the same height in the longitudinal direction. The upper edge of the building structure should, however, run parallel to the surface of the ground B which is assumed to be flat.

The control or regulating unit 14 has a second control loop 14B. As the slipform paver advances, the second control unit 14B controls the front lifting columns 6 such that the machine frame 2 remains with the concrete mold 9 in a parallel alignment to the surface of the ground B which is assumed to be flat. If the front running gear 4 travel over an elevation in the ground, for example, the front lifting columns are retracted out of the starting position by the corresponding distance so that the front running gear are raised and the machine frame is kept in a parallel orientation to the ground surface. When passing over a depression in the ground, the front running gear is extended out of the starting position by the corresponding distance. The construction and operation of a control unit of this type are described in detail in EP 2 104 768 B1 (U.S. Pat. No. 8,424,972).

The orientation of the machine frame 2 with respect to the ground surface is detected by a means 15 which is merely indicated in the figures and can be configured in different ways.

The means 15 for determining the orientation of the machine frame can comprise for example a means for measuring the distance of the machine frame from the ground surface, which means can comprise the rear distance sensor 15A and a front distance sensor 15B, for example an ultrasonic sensor. The orientation of the machine frame 2 can be determined from the difference of the distances to the ground measured by the distance sensors 15A and 15B. If the measured distance values are the same, it is assumed that the machine frame is oriented parallel to the surface of the ground. However, a determination of this type of the orientation of the machine frame assumes that the distance from the ground surface, which is assumed to be flat is measured, i.e. the distance in the region of a depression is not measured.

An alternative embodiment of the means 15 provides a means for measuring the inclination of the machine frame 2 to the horizontal by an inclination sensor 15C. This means can receive the data from a GNSS-based means 15D or from another system which can provide data, in particular height information from which it is possible to calculate the inclination of the ground. If the inclination of the ground is known, the difference between the inclination of the machine frame 2 to the horizontal measured by the inclination sensor 15C and the inclination of the ground surface, i.e. the inclination of the machine frame with respect to the ground surface, is calculated.

Figure 2:
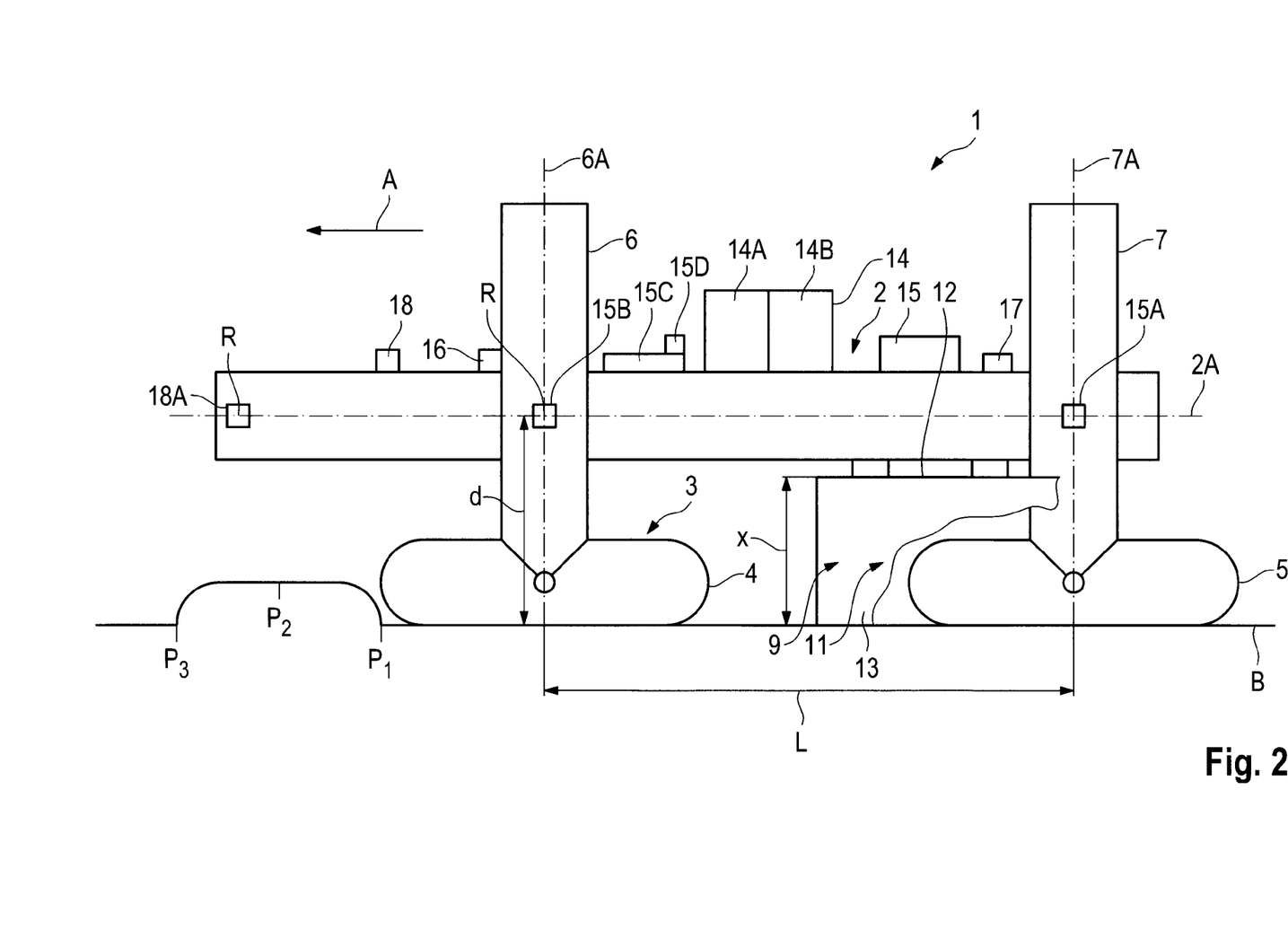
FIG. 2 is a greatly simplified schematic side view of a slipform paver before the front running gear travels over an elevation in the ground.
Figure 3:
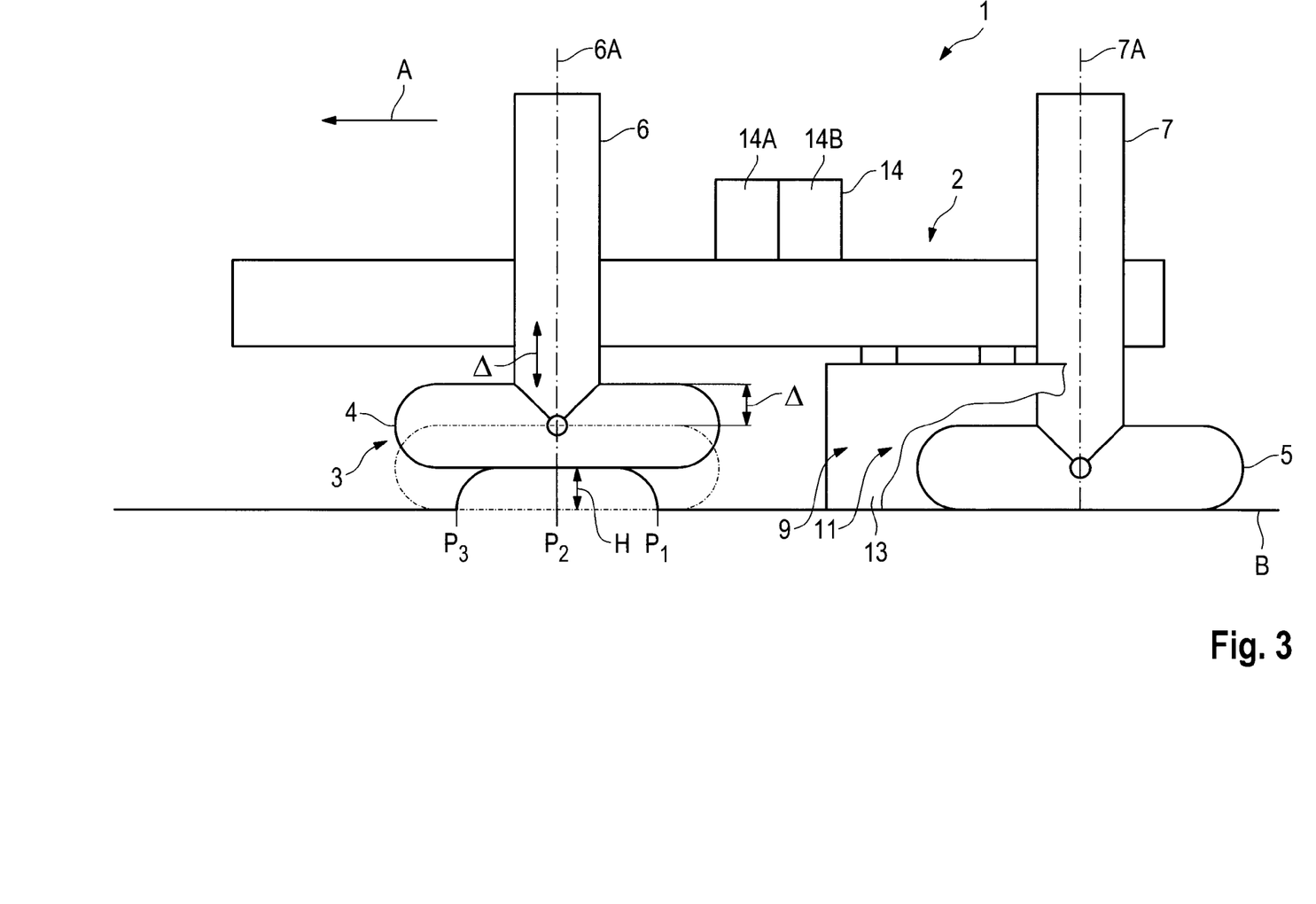
FIG. 3 shows the slipform paver while the front running gear travels over the elevation in the ground.
Figure 4:
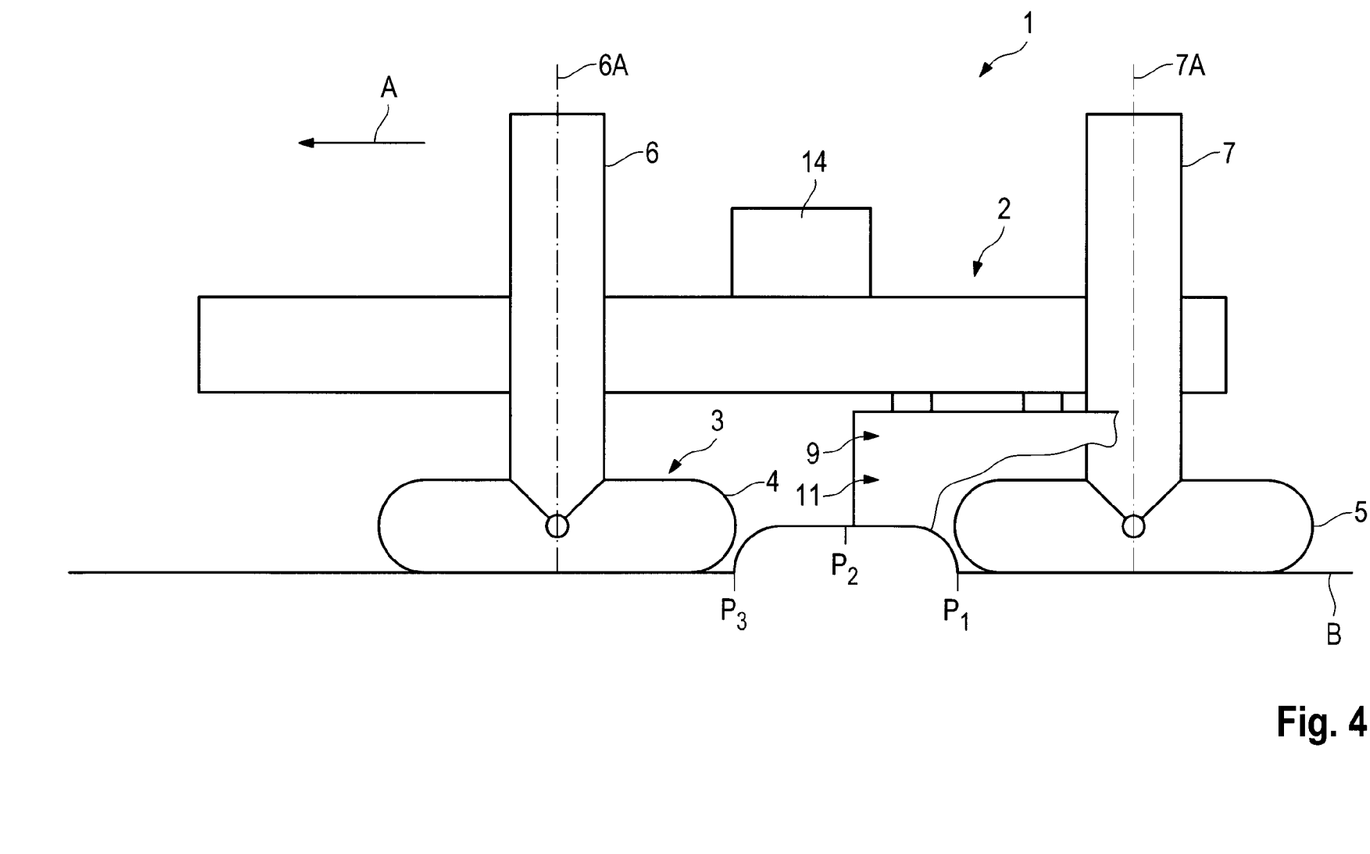
FIG. 4 shows the slipform paver after the front running gear has travelled over the elevation in the ground and before the rear running gear travels over the elevation in the ground.

FIG. 2 to 4 show the lifting movement of the front running gear 4 when travelling over an unevenness. The control unit 14 controls the lifting columns 6 of the front running gear 4 such that they are retracted accordingly when passing over the elevation. When the contact area of the front running gear reaches point $P_1$, the front lifting column 6 is controlled such that the front running gear 4 is retracted out of the starting position. At the apex $P_2$ of the elevation, the lifting column 6 or the running gear 4 is retracted out of the starting position by the distance Δ which corresponds to the height H of the elevation. When point $P_3$ has been passed, the lifting column 7 or the running gear 5 is again in the starting position. Consequently, the machine frame 2 remains in a parallel orientation to the surface of the ground.

The control or regulation according to the invention provides a correction of the control of the rear lifting columns 7 by the first control loop 14A subject to the control of the front lifting columns 6 by the second control loop 14B, the correction being carried out with a predetermined time delay which corresponds to the coverage of a predetermined distance L.

Figure 5:
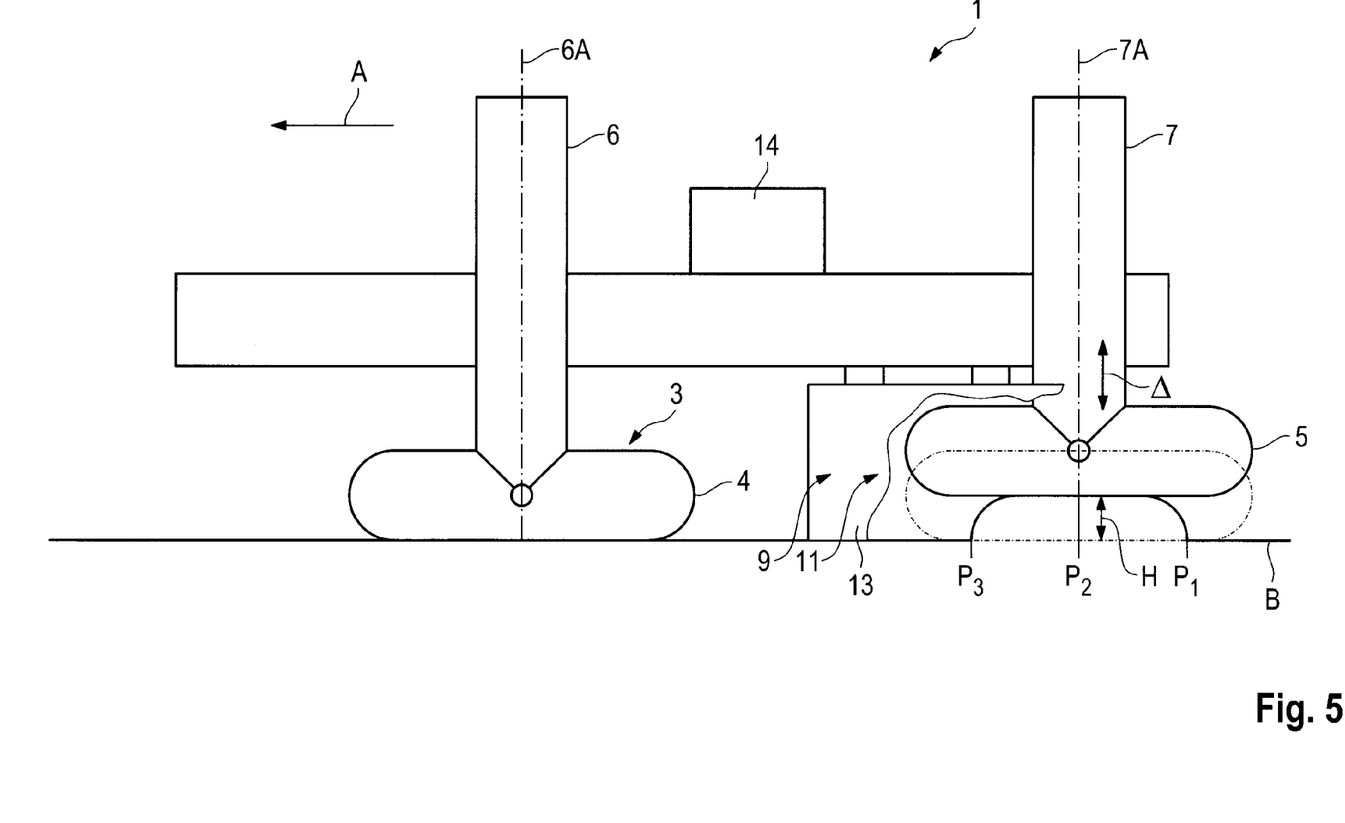
FIG. 5 shows the slipform paver while the rear running gear travels over the elevation in the ground.
Figure 6:
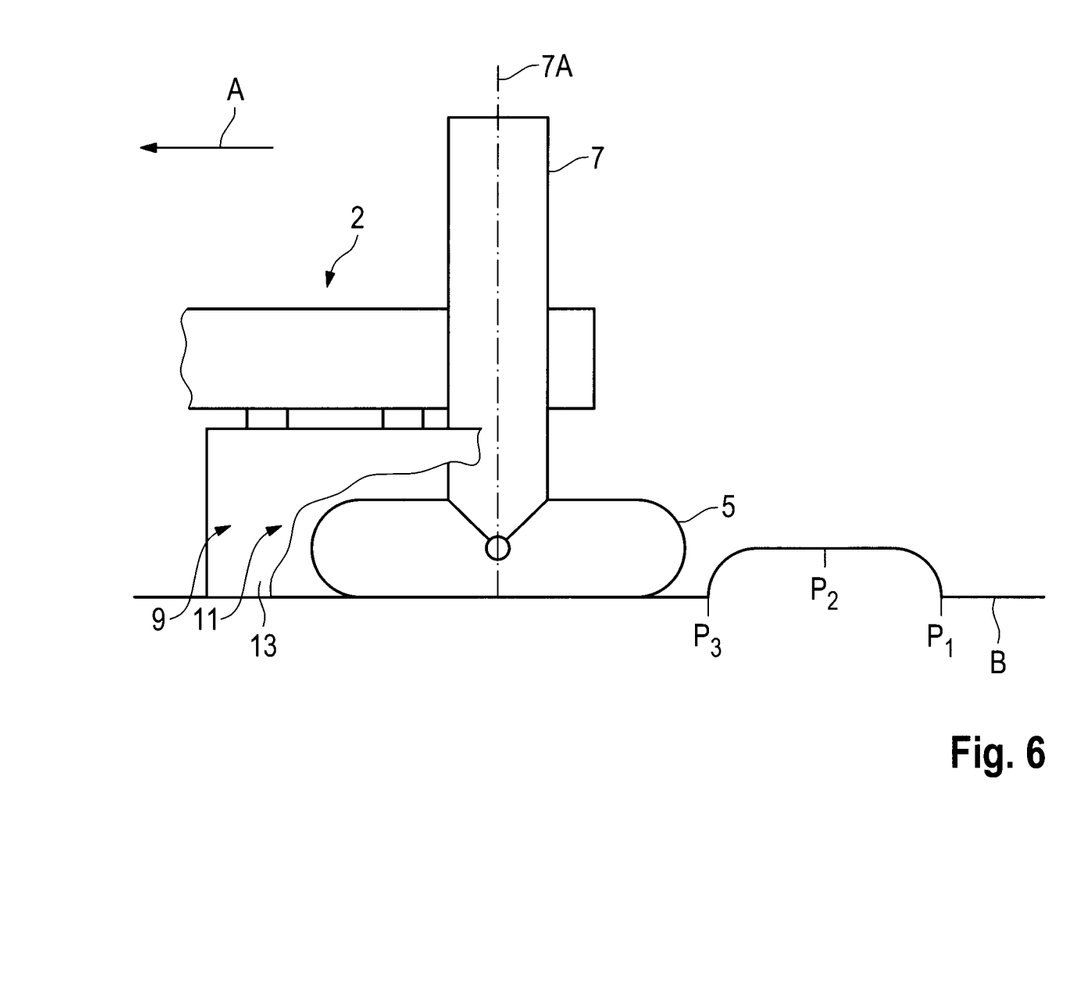
FIG. 6 shows the slipform paver after the rear running gear has travelled over the elevation in the ground.

FIG. 4 to 6 show that the movement of the front lifting column 6 or of the front running gear 4 is superimposed on the lifting movement of the rear lifting column 7 or of the rear running gear 5. The control or regulating unit 14 controls the lifting column 7 of the rear running gear 5 such that the rear running gear 5 performs the same lifting movement as the front running gear 4 which corresponds to the profile of the elevation, in addition to the lifting movement predetermined by the first control loop. The data describing the profile of the ground elevation is received by the control or regulating unit 14 when the front running gear 4 travels over the elevation.

The slipform paver has a first distance measuring means 16 for measuring the lifting position of the front lifting columns 6 and a second distance measuring means 17 for measuring the distance covered by the construction machine. The first distance measuring means 16 measures the distance by which the front lifting columns 6 are retracted so that the machine frame remains in the correct position (FIGS. 2 to 4). The output signal from the first distance measuring means 16 is a variable which correlates with the distance d between a reference point R on the machine frame 2 and the ground, it being possible for said reference point R to be located on the axis 6A of the front lifting column 6. The measured data from the first distance measuring means 16 describe the profile of the elevation travelled over by the rear running gear 5 with a time delay (FIGS. 4 to 6). The time delay results from the advance speed of the slipform paver and the distance L between the front and rear running gear 4, 5. The second distance measuring means 17 measures the distance covered by the front running gear 4 after travelling over the elevation. If the measured distance which has been travelled corresponds to the distance L between the front and rear running gear 4, 5, the control and regulating unit 14 activates the lifting columns 7 of the rear running gear 5 such that the lifting movement of the front lifting columns 6 or running gear 4 are superimposed on the lifting movement of the rear lifting columns 7 or running gear 5. It can be seen from FIGS. 4 to 6 that while the rear running gear 5 travel over the elevation, the concrete mold 9 is adjusted to the correct height with respect to the ground B. While travelling through a depression, the movements of the lifting columns or running gear are reversed. Thus, unevennesses in the ground do not result in different construction heights of the building structure (FIG. 8A to 8C).

Instead of a distance measuring means 16 which detects the lifting position of the front lifting columns, a distance measuring means 18 can also be provided which measures the distance d between a reference point R on the machine frame 2 and the ground B. This distance measuring means 18 can have a distance sensor 18A which is preferably arranged upstream of the front running gear 4. However, the distance sensor 18A can also be arranged on the longitudinal axis 6A of the front lifting column 6 so that the distance measurement can also be made by the distance sensor 15B.

Figure 8C:
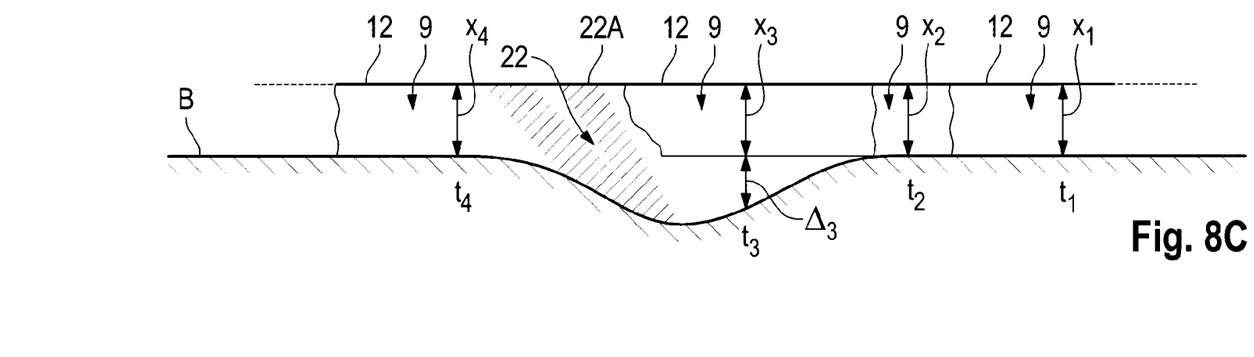
FIG. 8C shows the movement of a working system of a construction machine with the correction engagement according to the invention in the control of the rear lifting system, the ground having a depression.

FIG. 8C shows the additional lifting movement Δ of the rear lifting column 7 or of the rear running gear 5 while travelling through a depression, through which the front running gear 4 has already passed. Compared to FIG. 8B, it can be seen that the correction in the control of the first control loop 14A subject to the second control loop 14B results in the upper edge 22A of the building structure 22 remaining at the same height in the longitudinal direction even during travel through the depression. The rear lifting column 7 is extended by the amount Δ by which the front lifting column 6 was previously extended.

Figure 7:
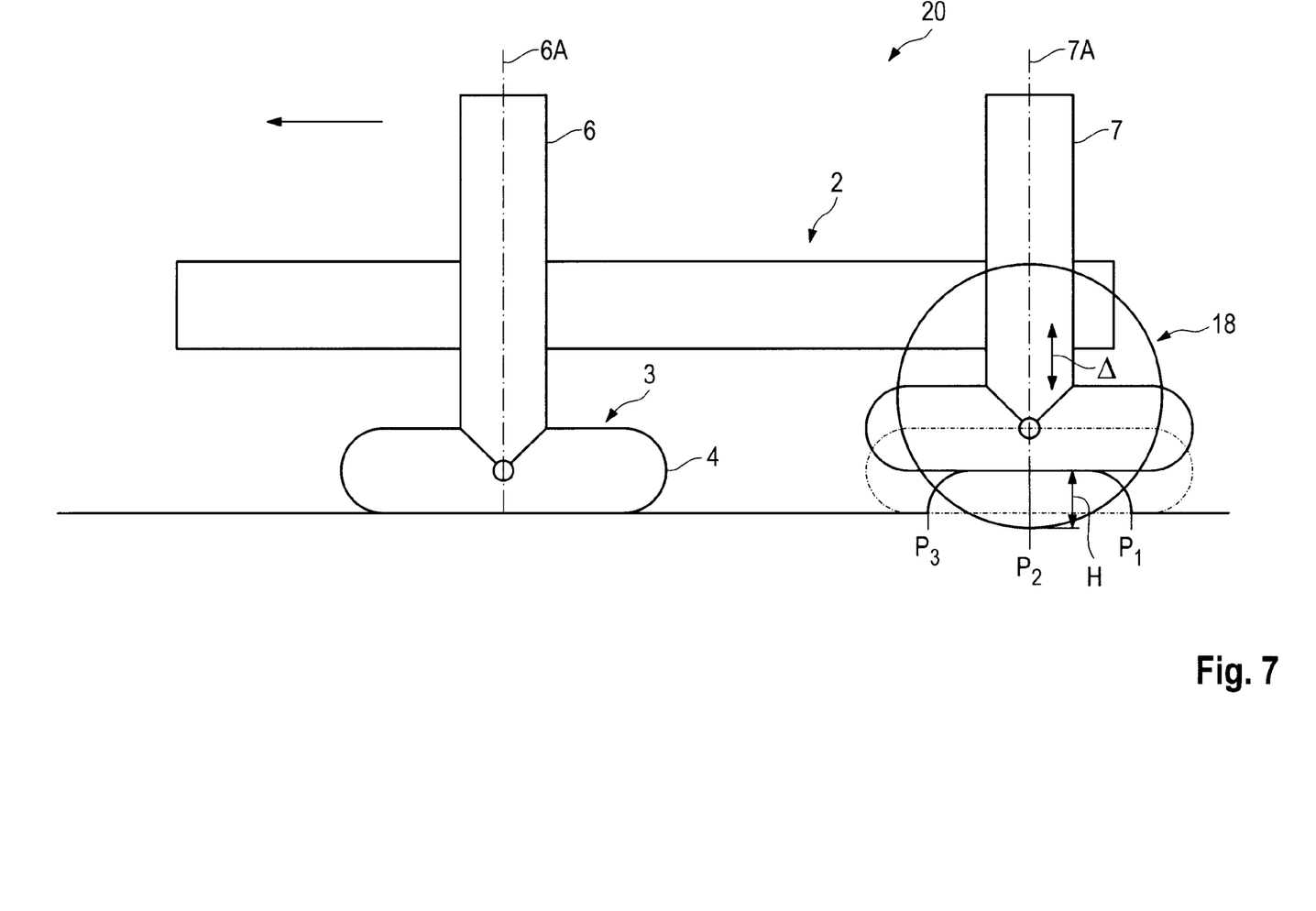
FIG. 7 is a greatly simplified schematic view of a road milling machine.

The same advantages provided for a slipform paver are also provided for a road milling machine. The only difference is that the construction machine has a milling drum 18 instead of a concrete mold. FIG. 7 shows a road milling machine 20 in a greatly simplified schematic form, the size of the individual parts not being true-to-scale. The mutually corresponding parts have been provided with the same reference signs. The road milling machine 20 has a milling drum 18 which is arranged on the machine frame 2. The axis 18A of the milling drum 18 is located in the longitudinal direction at the level of the axis of the rear lifting column 7 or of the rear running gear 5. The result of the control or regulation of the lifting movement of the rear running gear 5 with respect to the machine frame 2 is that while travelling over a portion-wise occurring elevation, the milling depth remains constant with respect to the actual surface of the ground.

What is claimed is:

1. An automotive construction machine, comprising:
    a machine frame having a working direction;
    at least one front running gear and at least one rear running gear configured to support the machine frame from a ground surface;
    a rearward device supported from the machine frame rearward of the front running gear;
    front and rear lifting systems connected between the machine frame and the front and rear running gears, respectively, for adjusting a height and orientation of the machine frame relative to the ground surface; and
    a control unit operably associated with the lifting systems, the control unit being configured such that:
    the front lifting system is controlled such that the machine frame remains in a predetermined orientation with respect to the ground surface in the working direction as the construction machine advances; and
    unevenness of the ground surface is compensated for in regard to a height of the rearward device relative to the ground surface with a time delay in response to control of the front lifting system.

2. The construction machine of claim 1, wherein:
    the control unit is configured such that as the construction machine advances the compensation regarding the height of the rearward device is in response to a variable correlating to a distance between a reference point on the machine frame and the ground surface.

3. The construction machine of claim 2, wherein:
    the reference point on the machine frame is located upstream of the rear running gear.

4. The construction machine of claim 2, wherein:
    the reference point on the machine frame is located substantially at the front running gear.

5. The construction machine of claim 2, wherein:
    the reference point on the machine frame is located upstream of the front running gear.

6. The construction machine of claim 2, further comprising:
    a tactile distance sensor configured to detect the distance between the reference point on the machine frame and the ground surface.

7. The construction machine of claim 6, wherein:
    the tactile distance sensor is configured to detect a lifting position of the front lifting system.

8. The construction machine of claim 2, further comprising:
    a contact-free distance sensor configured to detect the distance between the reference point on the machine frame and the ground surface.

9. The construction machine of claim 1, wherein:
    the control unit includes a distance sensor configured to measure a distance travelled by the construction machine; and the control unit is configured such that the time delay in compensation regarding the height of the rearward device corresponds to travel of the construction machine by a distance substantially corresponding to a distance between the front running gear and the rearward device.

10. The construction machine of claim 1, wherein:
the front and rear lifting systems comprise hydraulic lifting columns connecting the machine frame to the running gears, each lifting column having a longitudinal axis arranged at a right angle to a longitudinal axis of the machine frame; and
the control unit is configured such that the machine frame remains in a parallel orientation with respect to the ground surface in the working direction.

11. The construction machine of claim 1, wherein:
the control unit is configured to determine the orientation of the machine frame relative to the ground surface.

12. The construction machine of claim 11, wherein the control unit further comprises:
an inclination sensor configured to determine an inclination of the machine frame relative to horizontal;
a data source configured to provide data describing an inclination of the ground surface; and
wherein the control unit is configured to determine a difference between the inclination of the machine frame relative to horizontal and the inclination of the ground surface.

13. The construction machine of claim 1, wherein:
the construction machine is a slipform paver; and
the rearward device comprises a device for forming flowable material, including an outlet arranged substantially at the rear running gear relative to the working direction.

14. The construction machine of claim 1, wherein:
the construction machine is a road milling machine; and
the rearward device comprises a milling drum arranged between the front running gear and the rear running gear relative to the working direction.

15. A method for controlling an automotive construction machine, the construction machine including:
a machine frame;
at least one front running gear and at least one rear running gear, configured to stand on a ground surface;
a rearward device supported from the machine frame rearward of the front running gear; and
front and rear lifting systems supporting the machine frame from the front and rear running gears, respectively so that a height and orientation of the machine frame are adjustable relative to the ground surface;
the method comprising:
(a) as the construction machine advances, controlling a lifting movement of the front lifting system such that the machine frame remains in a predetermined orientation in the working direction with respect to the ground surface; and
(b) as the construction machine advances:
(b)(1) adjusting the lifting movement of the front lifting system to compensate for an unevenness of the ground surface encountered by the front running gear; and
(b)(2) then after a time delay compensating for unevenness of the ground surface relative to the rearward device in response to the adjustment of the front lifting system in step (b)(1).

16. The method of claim 15, wherein:
in step (b)(2) the compensating is done in response to a variable correlating with a distance between a reference point on the machine frame and the ground surface.

17. The method of claim 16, wherein the reference point on the machine frame is located upstream of the rear running gear.

18. The method of claim 16, wherein the reference point on the machine frame is located substantially at the front running gear.

19. The method of claim 16, wherein the reference point on the machine frame is located upstream of the front running gear.

20. The method of claim 16, wherein:
in step (b)(2) the variable correlates to a lifting position of the front lifting system.

* * * * *